May 17, 1960    W. H. MORRIS ET AL    2,936,645
PRELOADED BALL SCREW ASSEMBLY
Filed May 18, 1959
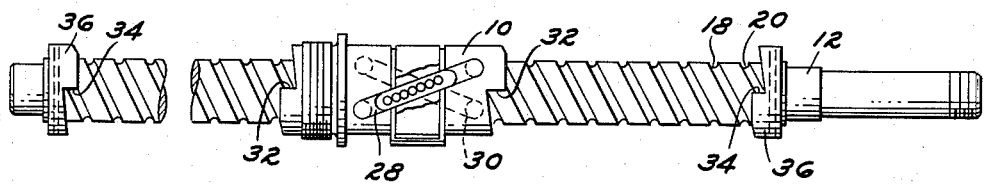
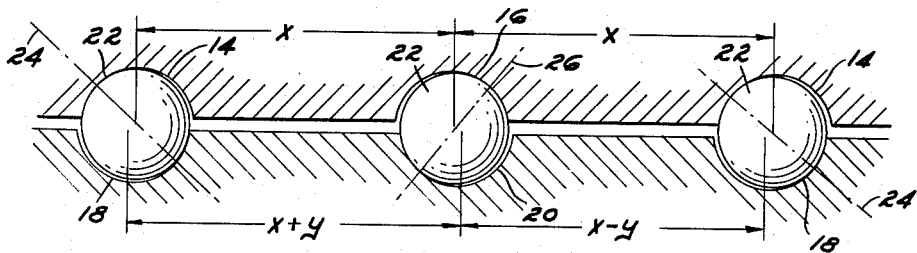
INVENTORS
WALTER H. MORRIS
PAUL ANDERSON
BY
ATTORNEYS

United States Patent Office 2,936,645
Patented May 17, 1960

2,936,645

PRELOADED BALL SCREW ASSEMBLY

Walter H. Morris and Paul Anderson, Rochester, Mich., assignors to Beaver Precision Products, Inc., Clawson, Mich., a corporation of Michigan Application May 18, 1959, Serial No. 813,984

7 Claims. (Cl. 74—441)

This invention relates to a ball screw assembly and more particularly to a preloaded ball screw assembly.

Ball screw assemblies are very often employed in machine tools and other devices as a highly efficient means for converting rotary movement of one member into translatory movement of another. In many applications, in some machine tools, for example, where an extremely high degree of positional accuracy is required, it is essential that there be no back-lash whatever in the ball screw assembly. Undesirable back-lash is conventionally eliminated by preloading the ball screw assembly in an axial direction.

The present invention has for its object the provision of a means for preloading ball screw assemblies which is simple, expedient and economical from the manufacturing standpoint.

More specifically, the invention contemplates a ball screw assembly integrally preloaded by forming the screw and nut each with a double start helical ball groove. On one of the two components of the assembly, the two grooves are spaced equally apart so that the spacing between successive convolutions is uniform. On the other component of the assembly, one of the grooves is slightly offset in an axial direction so that the two sets of opposed grooves of the nut and screw are slightly offset relative to one another. Thus, when balls of the proper size are inserted in the passageways formed by the two sets of opposed grooves, the assembly is stressed axially in opposite directions by the balls in the two sets of grooves; and back-lash is thereby eliminated.

In the drawing:

Fig. 1 is a view generally showing a ball screw assembly in accordance with the present invention.

Fig. 2 is an enlarged fragmentary sectional view showing the relationship between the ball grooves in the nut and the screw.

In the assembly illustrated in Fig. 1, the nut is designated 10 and the screw is designated 12. The nut is provided around its inner periphery with a double start helical ball screw designated 14, 16. The groove is likewise provided with a double start helical ball groove designated 18, 20. All of these ball grooves have the same lead. On the nut 10, the two grooves 14, 16 are spaced medially between one another; that is, the two starts are diametrically opposite. Thus, as is illustrated in Fig. 2, the spacing $x$ between successive convolutions of the two grooves on the nut 10 is uniform. On the screw 12, the two grooves 18 and 20 are slightly offset relative to the two grooves 14 and 16 on the nut. Thus, as is illustrated in Fig. 2, the distance between the convolution of groove 18 at the left and the adjacent convolution of groove 20 is equal to $x+y$ and the distance between the convolution of groove 20 and the convolution of groove 18 at the right is $x-y$. The balls 22 in the two sets of opposed grooves are all the same size. They have a diameter slightly greater than the minimum diameter of the passageways formed by the opposed grooves 14, 18 and 16, 20. Thus, the line of contact of ball 22 in grooves 14, 18 is axially inclined as indicated at 24; and the line of contact of ball 22 in grooves 16, 20 is axially inclined as indicated at 26. Thus, it will be apparent that the balls 22 in one set of opposed grooves stress the assembly axially in one direction and the balls in the other set of opposed grooves stress the assembly axially in the opposite direction. This eliminates all back-lash from the system.

In the specific arrangement illustrated in Fig. 1, the nut 10 is provided with two diametrically opposed ball return tubes 28, 30. The provision of such external ball return tubes is conventional. Likewise, at each end of nut 10, there is provided an axially extending shoulder 32 engageable with a similar shoulder 34 on collars 36 at opposite ends of the screw. The provision of return tubes 28, 30 and stops 36 form no part of the present invention. The invention involved here is related specifically to the simple and expedient means for axially preloading the ball screw assembly to eliminate back-lash therefrom.

Thus, it will be seen that the present invention provides means for preloading ball screw assemblies which are very effective while at the same time, relatively inexpensive. The means for preloading the assembly form an integral part of the assembly and requires no additional parts such as jam nuts, thrust bearings, etc. The degree of preloading can be controlled to the extent desired either by the diameter of the balls employed or by the magnitude of the offset "$y$" provided between the two grooves on the screw.

We claim:

1. In a ball screw assembly, the combination of a screw member having a double start helical ball groove thereon, a nut member having a double start helical ball groove thereon, the successive convolutions of the two grooves on one of said members being uniformly spaced apart, the successive convolutions of the two grooves on the other member being spaced apart slightly non-uniformly, said grooves all having the same lead and balls in the opposed grooves having a nominal diameter greater than the minimum diameter of the two passageways formed by the two sets of opposed grooves, whereby to preload the assembly and eliminate back-lash therefrom.

2. In a ball screw assembly, the combination of a screw member having a double start helical ball groove thereon, a nut member having a double start helical ball groove thereon, the two grooves on the nut being generally radially juxtaposed to the two grooves on the screw to form a helical ball passageway therebetween, the spacing between successive convolutions of the two grooves on one of said members being slightly different than the spacing between the successive convolutions on the other member and a plurality of balls in said opposed grooves interengaging said members for relative circumferential and transitory movement, said balls having a nominal diameter greater than the minimum diameter of the passageway formed by the opposed grooves whereby to preload the assembly and eliminate back-lash therefrom.

3. In a ball screw assembly, the combination of a screw member having a double start helical ball groove thereon, a nut member having a double start helical ball groove thereon, the leads of both sets of said grooves being the same and the successive convolutions of one groove on one of said members being spaced medially between the successive convolutions of the other groove on said one member and the successive convolutions of one groove on the other member being axially offset slightly from a medial position between the successive convolutions of the other groove on said other member and a plurality of balls in said two sets of grooves, said balls having a nominal diameter slightly greater than the minimum diameter of the passageway formed by the opposed grooves of the two members whereby the balls preload the assembly and eliminate back-lash therefrom.

4. In a ball screw assembly, the combination of a screw member and a nut member each having a double start helical ball groove thereon, the two sets of grooves being generally radially juxtaposed to form two helical ball passageways between the nut and screw members, the leads of both sets of said grooves being the same, the spacing between the grooves on each of said members being such that the two grooves on one of the members are axially offset slightly in opposite directions with respect to the grooves on the other member and a plurality of balls in said grooves, said balls having a diameter slightly greater than the minimum diameter of the two passageways formed by the two sets of grooves whereby to preload the assembly and eliminate back-lash therefrom.

5. The combination called for in claim 4 wherein the two grooves on one of said members are spaced apart equally along the axis of said member.

6. The combination set forth in claim 4 wherein the grooves of said last mentioned member are offset such that considering three successive sets of opposed grooves, the grooves of the intermediate set are axially offset in one direction and the grooves of the other two sets are axially offset in the opposite direction.

7. In a ball screw assembly, the combination of a nut having a double start helical ball groove thereon, a screw having a double start helical ball groove thereon, the leads of said two sets of ball grooves being the same, one groove on the nut having its convolutions spaced medially between the convolutions of the other groove on the nut, the spacing between the two grooves on the screw being slightly different than the spacing between the two grooves on the nut whereby one set of opposed grooves on the nut and screw are axially offset in one direction relative to one another and the other set of opposed grooves on the nut and screw are axially offset in the opposite direction to the same extent and a plurality of balls in the opposed sets of grooves, said balls having a nominal diameter greater than the minimum diameter of the passageways formed by the two sets of opposed grooves whereby to preload the assembly and eliminate back-lash therefrom.

References Cited in the file of this patent
UNITED STATES PATENTS

| | | |
|---|---|---|
| 2,749,812 | Wetzel | June 12, 1956 |
| 2,799,178 | Schultz | July 16, 1957 |
| 2,857,778 | Rokos | Oct. 28, 1958 |